United States Patent [19]

Siol et al.

[11] Patent Number: 4,535,137

[45] Date of Patent: * Aug. 13, 1985

[54] METHOD FOR MAKING A SALT FREE SOLID POLYMER FROM A POLYMER EMULSION

[75] Inventors: Werner Siol, Darmstadt; Hubert Rauch, Weiterstadt; Guenter Fleck, Darmstadt-Arheilgen, all of Fed. Rep. of Germany

[73] Assignee: Röhm GmbH, Darmstadt, Fed. Rep. of Germany

[*] Notice: The portion of the term of this patent subsequent to May 15, 2001 has been disclaimed.

[21] Appl. No.: 448,407

[22] Filed: Dec. 9, 1982

[30] Foreign Application Priority Data

Dec. 17, 1981 [DE] Fed. Rep. of Germany ....... 3149941

[51] Int. Cl.$^3$ ................................................ C08F 2/00
[52] U.S. Cl. ..................................... 526/216; 526/193
[58] Field of Search ......................... 526/216; 564/193

[56] References Cited

U.S. PATENT DOCUMENTS

| 3,054,786 | 9/1962 | Burkholder et al. | 526/216 |
| 3,288,772 | 11/1966 | Becker | 526/216 |
| 4,302,377 | 11/1981 | Gurak et al. | 528/487 |
| 4,306,648 | 12/1981 | Yoshida et al. | 526/193 |
| 4,336,638 | 5/1982 | Wolfers et al. | 526/210 |
| 4,448,945 | 5/1981 | Fink et al. | 526/193 |

FOREIGN PATENT DOCUMENTS 1142425 2/1969 United Kingdom ............... 526/193

OTHER PUBLICATIONS

"Mechanism of Polymer Reactions", G. M. Burnett, Interscience Publishers Inc., New York (1954), pp. 301–303.

*Primary Examiner*—Joseph L. Schofer
*Assistant Examiner*—Peter F. Kulkosky
*Attorney, Agent, or Firm*—Curtis, Morris & Safford

[57] ABSTRACT

What is disclosed is a method for making a substantially salt free solid polymer product from an emulsion polymer prepared with the aid of a free emulsifier acid having a pKa in the 1.0 to 4.5 range, the dispersion so obtained being precipitated by the addition thereto of a strong acid.

7 Claims, No Drawings

METHOD FOR MAKING A SALT FREE SOLID POLYMER FROM A POLYMER EMULSION

The present invention relates to a method for making a substantially salt free solid polymer from a polymer emulsion.

Among polymerization methods, emulsion polymerization is of special importance. The method lends itself to the polymerization of insoluble or only partially soluble monomers such as styrene, isoprene, butadiene, halogenated dienes, acrylonitrile, vinyl chloride, esters of acrylic and methacrylic acid, and vinyl esters (optionally by way of copolymerization), which are present in the water as finely dispersed droplets. The monomers are dispersed with the aid of suitable emulsifiers, which usually are anionic (for example, alkali metal salts of fatty acids, alkyl-, aryl-, or alkylaryl-sulfonates, alkylarylsulfonic acids and their salts, and their condensation products with formaldehyde, sulfosuccinic esters, etc.), cationic (for example, amine salts, quaternary ammonium salts, and ester amines) or nonionic (for example, the products of addition reactions of ethylene oxide with alkyl phenols). Polymerization then takes place in the micelles formed, which swell to form latex particles as polymerization progresses.

As a rule, the emulsifier concentration should range from 0.05 to 5 weight percent, based on the monomers.

The initiators are predominantly water soluble compounds (for example per compounds such as peroxides and hydroperoxides, potassium persulfate, and redox initiators), generally used in amounts ranging from 0.01 to 2 weight percent, based on the monomers.

In addition, chain transfer agents (for example, sulfur chain transfer agents such as 2-ethylhexyl thioglycolate) may be included in the polymerization recipe for regulation of the molecular weight.

Finally, the reaction may be stopped by means of stopping agents (for example water soluble reducing agents). The polymer can be recovered from these dispersions by spray drying, freeze drying, or precipitation. The precipitation method is usually employed with latices prepared with the use of anionic emulsifiers.

Prior to coagulation and the drying which follows, suitable stabilizers may, if necessary, be added to the polymerization mixture.

Most often, precipitation (coagulation) of the latices is effected by means of electrolytes. These include, for example, sulfuric acid and its salts such as aluminum sulfate and sodium sulfate, or salts of hydrochloric acid such as calcium chloride, sodium chloride, etc.

The amount of electrolytes to be added usually is substantial and may range from 0.5 to 10 weight percent, based on the solid polymer.

Precipitation is usually followed by a washing operation for removal of the salts included during precipitation, whether the salts are those added for the purpose of coagulation or those formed from sulfuric acid and the salt of an emulsifier acid which is used (for example, sodium sulfate formed from sodium stearate and sulfuric acid).

However, the salts cannot always be dissolved out completely. This is why polymers produced from dispersions by precipitation with electrolytes usually have poorer optical and electrical properties than do bulk polymers of the same monomeric composition. Moreover, the electrolyte precipitated polymers usually have higher water absorption capacity.

With a view to obtaining a polymer product that is as free of electrolyte as possible, precipitation with alcohols has also been investigated. Alcohols having from 5 to 6 carbon atoms exhibit optimum activity in precipitation. One drawback of this method is that the alcohol, used in relatively large quantities, must usually be recovered. Satisfactory precipitation of polyvinyl chloride, for example, requires about 10 weight percent of amyl alcohol. Moreover, heating to 100° C. is necessary if precipitation is to be complete. Thus, there has been a need to develop a method for the precipitation of polymers from dispersions wherein the need for a subsequent removal of the electrolyte by washing is obviated while known and proven process sequences and process parameters are largely retained.

It has now been found that polymer dispersions can readily be precipitated to give substantially salt free polymers if a free acid having emulsifier action (an "emulsifier acid") having a pKa between 1.0 and 4.5 is used, if the polymerization is carried out in the absence of strong acids, and if the polymer dispersions obtained are precipitated by the addition of relatively small amounts of a strong acid. The term "substantially salt free" as used in the present specification and claims means less than 0.05 weight percent, preferably less than 0.01 weight percent, of salt based on the weight of the polymer.

Precipitation usually leaves a perfectly clear (in other words, substantially polymer free) serum.

The emulsifier acids to be used in accordance with the present invention in the preparation of the dispersions correspond, with respect to their structure, to surface active compounds, in other words, in addition to the hydrophilic part of the molecule which is formed by the acid, they have a lipophilic part. Moreover, the pKa of these acids should be within the range mentioned (1.0 to 4.5).

The acids to be used in accordance with the invention have a surface active character also in the form of the free acid. By the above criteria, for example, long chain carboxylic acids without activating groups do not fall within the class of emulsifiers to be used in accordance with the invention.

Moreover, it should be possible to convert the emulsifier acids of the invention into the undissociated form with even relatively small amounts, preferably equimolar amounts, of a stronger acid. Very strong emulsifier acids, for example, long chain sulfonic acids, do not satisfy this condition.

The emulsifier acids suited for use in accordance with the invention include activated carboxylic acids, for example alkyl malonates and succinates of the formula

wherein $R_1$ is alkyl having from 8 to 22, and preferably up to 18, carbon atoms and n is 0 or 1; alkyltricarboxylates of the formula

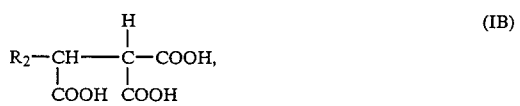

wherein $R_2$ is alkyl having from 6 to 22, and preferably up to 18, carbon atoms; fluorinated carboxylic acids of the formula $$R_3\text{—COOH,} \qquad (IC)$$

wherein $R_3$ is at least partially fluorinated alkyl having from 5 to 20 carbon atoms; free acids of long-chain substituted amino acids, for example of the formula $$\underset{\underset{R_5}{|}}{R_4-\overset{\overset{O}{\|}}{C}-N-CH_2-COOH,} \qquad (ID)$$

wherein $R_4$ is alkyl having from 1 to 20 carbon atoms and $R_5$ is hydrogen or alkyl having from 1 to 20 carbon atoms, providing that the sum of the carbon atoms of $R_4$ and $R_5$ is greater than 6 and less than 22; and free long-chain oxocarboxylic acids of the formula $$R_6\text{—O—CHR}_7\text{—COOH,} \qquad (IE)$$

wherein $R_6$ is alkyl having from 1 to 20 carbon atoms and $R_7$ is hydrogen or alkyl having from 1 to 18 carbon atoms, providing that the sum of the carbon atoms of $R_6$ and $R_7$ is greater than 6 and less than 22.

Complex acids of organophosphorus compounds having long chain alkyl groups in the molecule, and in particular acidic phosphate esters, phosphite esters, and phosphonic acids (compounds of the following formulas II A–C), are also suitable.

These include phosphoric acid monoesters or phosphate diesters of the general formula $$\begin{array}{c} R'_8-O-\overset{\overset{O}{\|}}{P}(OH), \\ R_8-O \end{array} \qquad (IIA)$$

wherein $R_8$ is alkyl having from 6 to 20 carbon atoms, or aryl substituted with $C_2$–$C_{22}$ alkyl, and in particular phenyl or oxyethylated alkylphenol having from 4 to 16 carbon atoms in the alkyl and formed by reaction with from 1 to 10 ethylene oxide units, and $R'_8$ is hydrogen (i.e. a phosphoric acid monoester) or is alkyl having from 1 to 20 carbon atoms. $R'_8$ may also have the other meanings given for $R_8$.

Moreover, phosphoric acid esters of glycols and glycerides, of the formula $$\begin{array}{c} R_9-OCH_2 \\ | \\ R_9-OCH \\ \overset{O}{\underset{\|}{}} \quad | \\ (OH)_2P-O-CH_2, \end{array} \qquad (IIB)$$

are included, for example wherein $R_9$ is hydrogen or alkyl having from 1 to 20 carbon atoms, or is $R_{10}$—COO— wherein $R_{10}$ is alkyl having from 1 to 20 carbon atoms, providing that an alkyl group having 8 or more carbon atoms be present in the molecule. Complex phosphonates of the formula $$\underset{\underset{O}{\|}}{R_{12}-O-\overset{\overset{OR_{11}}{|}}{P}-O(CH_2)_2-O-\underset{\underset{O}{\|}}{P}(OH)_2,} \qquad (IIC)$$

wherein $R_{11}$ is alkyl having from 8 to 20 carbon atoms and $R_{12}$ is a group having from 1 to 20 carbon atoms, are also contemplated.

For example free acids of complex phosphoric acid esters, such as phosphated nonylphenol which has been reacted with 5 moles of ethylene oxide, perfluorinated carboxylic acids, free acids of long chain sarcosides and glycides, alkylmalonic acids, and 2-oxo-carboxylic acids such as 2-oxolauric acid, are specifically mentioned.

In general, the amount of free emulsifier acids added will range from 0.01 to 2 weight percent, and preferably from 0.05 to 1 weight percent, based on the polymer solids.

Generally, vinyl compounds which are capable of being polymerized with free radicals (for example, the monomers listed in Ullmanns Encyklopaedie der Technischen Chemie, 3rd ed., vol. 14 (1963), Urban & Schwarzenberg, pp. 108–109), are suitable for use with the process of the invention, provided that the resulting polymers or copolymers do not have a markedly hydrophilic character. Thus, more than 50 weight percent, and preferably more than 60 weight percent, of the monomers are insoluble or difficultly soluble in water, i.e. they have a water solubility of less than 10 weight percent and preferably less than 5 weight percent at room temperature. The use of acrylic or methacrylic acid or of other acids, as well as of basic monomers, has a limiting effect. A content of about 10 weight percent (generally less than 5 weight percent) of a polymerizable acid (acrylic or methacrylic acid) will serve as a limiting guide value.

For example, vinyl monomers such as the esters, acids, amides, and nitriles of acrylic acid and/or methacrylic acid (including monomers replaced in the ester or amide group by functional groups such as hydroxyl groups or nonbasic or merely weakly basic heterocyclic functional groups, and other hydrophilic monomers such as the monoesters of polyols), styrene and its derivatives such as alpha-methylstyrene or vinyltoluene, polymerizable dienes such as isoprene, butadiene, and their halogenated derivatives, and the esters of polymerizable dicarboxylic acids such as maleate and fumarate esters are suitable for use with the process of the invention.

Specifically, emulsion polymers or copolymers based on the methyl-, ethyl-, n-propyl-, isopropyl-, n-butyl-, isobutyl-, isoamyl-, and 2-ethylhexyl-esters of acrylic and/or of methacrylic acid (see Houben-Weyl-Mueller, 4th ed., vol. XIV/1, p. 1048 [1961], as well as acrylonitrile and methacrylonitrile, should be mentioned. Further, copolymers of said monomers with styrene and/or alpha-methylstyrene in minor amounts, for example, from 0 to 40 weight percent, based on the total monomers, are also suitable.

The following can also be used as comonomers, to be copolymerized generally in amounts ranging from 0 to 20 weight percent, and more particularly from 0 to 8 weight percent, based on the total monomers: acrylamide; methacrylamide; N-alkyl substituted acrylamides and methacrylamides (alkyl substituents here generally meaning those having from 1 to 6 carbon atoms); these comonomers substituted with functional groups; alkyl esters and alkyl amides of acrylic and/or of methacrylic acid substituted with hydroxyl groups; N-methylol and N-methylol ether compounds of methacrylamides and acrylamides; and esters of acrylic acid or of methacrylic acid containing oxirane groups, for example glycidyl esters.

Finally, the emulsion polymers to be produced in accordance with the invention may further contain crosslinking monomers in amounts of generally less than 10 weight percent, and usually between 0.1 and 2 percent, based on the total monomers.

These may be known crosslinking monomers, for example, polyvinyl compounds such as the diesters or triesters of acrylic and/or of methacrylic acid with diols or triols, for example ethylene glycol dimethacrylate and acrylate, propanetriol triacrylate, 1,3- and 1,4-butanediol dimethacrylates and methacrylates, as well as graft crosslinking monomers such as allyl methacrylate and acrylate, vinyl oxyesters of methacrylic and acrylic acid, and crosslinking agents of the trisvinylcyclohexane type.

The known techniques of emulsion polymerization may be employed also with the present process (see Houben-Weyl, Methoden der Organischen Chemie, vol. 14, part 1), with the polymerization mixture containing the emulsifier acids defined above in accordance with the invention. The degree of polymerization of the polymers to be precipitated will generally range from 100 to 10,000. The average radius of the latex particles will usually range from 20 to 20,000 nm, and more particularly from 40 to 1,500 nm. The solids content of the dispersions may vary within certain limits and may range from 10 to 60 weight percent, for example. Depending on the concentration and on the degree of polymerization, the viscosity of the dispersions usually ranges from 1 to 10,000 mPa. sec.

The reaction may be conducted by a single batch or multiple batch method, but is preferably conducted by a monomer or emulsion continuous feed method. The polymerization is preferably started with conventional initiators, initiators which are salt free or which will not form salts in the course of the subsequent operations being preferred. Suitable initiators are, in particular, per compounds such as peroxide or per acids, azo compounds, and redox systems. (See Brandrup-Immergut, Polymer Handbook, Interscience.) Initiators which have proven themselves are, in particular, peroxides such as $H_2O_2$, salt free redox systems formed from peroxides and mercaptans, peroxo acids such as peroxodiphosphoric acid, azo compounds such as 2,2'-azobisisobutyronitrile, 4,4'-azobis-4-cyanovaleric acid, etc.

The initiator content usually ranges from 0.005 to 1 weight percent, and perferably from 0.02 to 0.5 weight percent, based on the monomers.

The emulsifier acid is added in the manner in which emulsifiers are usually added.

The polymerization temperature is in the range usual for polymerization methods of this type using said initiators. For example, it may range from 20° to 120° C. and preferably ranges from 40° to 95° C. If indicated, the polymerization should be carried out under pressure. As a rule, the polymerization time ranges from 1 to 10 hours, the feed-in phase usually being followed by a final polymerization phase whose duration is from one-half to twice the feed-in time. On completion of polymerization, coagulation or precipitation of the polymer may be effected.

Prior to coagulation, the polymer may have to be diluted to a solids content of from 10 to 30 weight percent. Coagulation or precipitation is brought about by the addition of strong acids. Suitable strong acids are inorganic acids such as sulfuric acid, hydrochloric acid, and perchloric acid, for example. These may be appropriately diluted, a guide value, for example, being 1% solutions of these acids. Aqueous solutions of organic acids, and preferably of carboxylic acids which have activating groups, are also suitable for use. In general, the pKa (of the first stage of dissociation) of these acids should be between 0 and 2.5. Examples are oxalic acid ($pK_1=1.23$), maleic acid ($pK_1=1.83$), dihydroxymalonic acid ($pK_1=1.92$), cyanoacetic acid ($pK=2.45$), and trichloroacetic acid ($pK=0.70$). Of course, the acids used for precipitation of the dispersions must not have any alkyl chains with more than 4 carbon atoms, in other words, they must not themselves act as surface active agents.

In general, small amounts of the strong acids, for example from 0.02 to 2 weight percent of acid, based on the solid polymer, will suffice for precipitation.

Precipitation may be carried out by adding the polymerization mixture, possibly after diluting it, to a solution of the strong acid either continuously or in portions and with agitation, the acid solution having preferably been first heated to a temperature above room temperature, for example, to 70° to 95° C. However, the solution of the strong acid may also be added cold to the dispersion to be precipitated, with heating being done only then.

It is recommended that agitation be continued at an increased temperature for some time, for example up to about two hours, and preferably for about half an hour. The precipitation temperature or subsequent heating temperature will depend on the hardness of the polymer. For example, a polymer having a glass transition temperature of 80° C. can be already agglomerated at 60° C. into particles which can readily be handled, whereas a material such as polymethyl methacrylate with a glass transition temperature of 105° C. when precipitated at 60° C. will yield only loosely cohering agglomerates which will give off much dust in a dry state. In this case, it will be advisable to carry out precipitations or subsequent heating of the precipitated material at as high a temperature as possible, for example, 95° C.

The precipitated polymer products generally have a high solids content (about 45% and up).

The method of the invention should be of interest especially where high purity of the products is a factor. The method is used to good advantage also with dispersions which usually have a low solids content and therefore are expensive to spray dry. It is of advantage also in the production of PVC processing aids and of plastisols comprising acrylates. The method of the invention generally represents a low cost and ecologically innocuous alternative to the prior art processes. A special advantage is the uncommonly high purity of the solid products obtained.

The examples which follow will serve to illustrate the process.

EXAMPLE 1

Preparation of Dispersion

In a Witt jar equipped with agitator, thermometer, reflux condenser, and dropper funnel, a solution of 0.5 g of an emulsifier acid formed of phosphated and five-fold hydroxyethylated isononylphenol [i—$C_9H_{19}$—$C_6H_4$—$O(C_2H_4O)_5$—$PO_3H_2$] and 2 g of azobis-4-valeric acid (sodium salt) in 1700 g of water was prepared and heated to 80° C. An emulsion previously prepared from 5 g of the above emulsifier, 4 g of the above initiator, 1600 g of methyl methacrylate, 200 g of ethyl acrylate, and 2500 g of water was then metered uniformly over a period of 3 hours into this initial charge. The mixture was then maintained at 80° C. for 2 hours. After cooling to room temperature, a readily filterable, low-viscosity, stable dispersion with a solids content of 30% and containing particles with a particle diameter of 150 nm was obtained.

EXAMPLE 2

Preparation of Dispersion 3.6 g of the emulsifier named in Example 1, 2 g of the initiator named in Example 1, and 1450 g of distilled water were charged into a polymerization vessel of the type described in Example 1 and heated to 80° C. Into this charge there was then metered at 80° C. over a period of 4 hours an emulsion previously prepared from 16 g of the above emulsifier, 2 g of the above initiator, 1440 g of methyl methacrylate, 960 g of butyl methacrylate, and 2200 g of distilled water. This mixture was then maintained at 80° C. for 90 minutes. After cooling to room temperature and filtration, an extremely finely particulate dispersion was obtained. Solids content, 40%; pH value, 3.2; viscosity, 10000 mPa/sec.

EXAMPLE 3

Precipitation 500 ml of 0.5% sulfuric acid were heated to 80° C. 500 ml of the dispersion of Example 1 were added to this dropwise over a period of 15 minutes. This was followed by agitation at 90° C. for 30 minutes. Cooling and suction filtering was followed by two washes with 500 ml of distilled water. A precipitate having a solids content of 70% was obtained. The wash water was clear. After drying at 30° C., a finely divided, free flowing powder which dissolved in organic solvents such as methyl ethyl ketone to give a clear solution was obtained.

EXAMPLE 4

Precipitation

The procedure used in Example 3 was followed, except that precipitation was carried out with 0.5% oxalic acid. A precipitate having a solids content of 60% was obtained. The wash water was clear. In this case, too, an easily handled powder was obtained which dissolved in organic solvents to give a clear solution.

EXAMPLE 5

Precipitation 250 g of the dispersion of Example 2 were diluted with 250 g of distilled water. To this, 250 g of 0.4% sulfuric acid were added over a period of 15 minutes at room temperature. This was followed by 15 minutes' agitation at room temperature. The precipitate was diluted by the addition of 250 ml of distilled water and then agitated for 30 minutes at 50° C. The coagulate so obtained could readily be filtered off by suction. After two washes with 500 ml portions of distilled water, a powdered polymer having a solids content of over 50% was obtained. Drying at room temperature yielded a powder which dissolved in methyl ethyl ketone or toluene to give a clear solution.

EXAMPLE 6

Preparation of Dispersion

In a Witt jar equipped as described in Example 1, a solution of 50 g of hydrogen peroxide (30% by weight in water) in 1400 g of distilled water was prepared. 1.5 g of a six-fold oxyethylated and phosphated isodecanol (comprising ca. 85 percent of monophosphate and ca. 15% of diphosphate) are added thereto. The mixture is heated to 80° C. and 600 g of methylmethacrylate are added dropwise over a period of four hours. After addition of one half of the methylmethacrylate, another 25 g of hydrogen peroxide (30% by weight in water) are added. After the monomer has been added, the mixture is stirred for another 3 hours at 80° C. After cooling to room temperature a readily filterable stable dispersion of low viscosity with a, solids content of 29% is obtained.

EXAMPLE 7

Precipitation

The dispersion prepared in Example 6 can be precipitated using the procedure given in Example 3 except that 1% sulfuric acid was employed. After precipitation, the mixture is stirred for 2 hours at 90° C.

Drying at room temperature yielded a free flowing powder which dissolved in methylethyl ketone to yield a clear solution.

EXAMPLE 8

Preparation of Dispersion

The procedure used in Example 1 was followed except that perfluorinated C9-carboxylic acid was used as an emulsifier. For precipitation, the procedure used in Example 3 was followed. One obtains a powder which dissolves in methylethyl ketone to give a clear solution.

EXAMPLE 9

Preparation of Dispersion and Precipitation

In a Witt jar equipped as described in Example 1, a solution of 0.7 g of an emulsifier acid formed of phosphated and fivefold oxyethylated isononylphenol (i—$C_9H_{19}$—$C_6H_4$—O—$(C_2H_4O)_5$—$PO_3H_2$), 10 g of hydrogen peroxide (30% in $H_2O_2$), and 1400 g of deionized water was prepared. The mixture is heated to 85° C. and is maintained at this temperature. An emulsion previously prepared of 4.0 g of azo-bis-isobutyronitrile, 2.0 g of the above emulsifier, 0.2 g of 2-ethylhexylthioglycolate, 120 g of ethylacrylate, and 480 g of styrene is added dropwise within 4 hours.

The solution is stirred at 80° C. for 2 hours and is cooled to room temperature. After filtration, the polymer is precipitated using 0.5 percent sulfuric acid. Precipitation is effected as described in Example 3. The dry product is a white non-glassy powder which dissolves in toluene within 10 minutes to give a clear solution.

EXAMPLE 10

Preparation of Dispersion and Precipitation

In a 4 l round bottom flask with stirring device, a mixture of 720 g of water, 1 g of an emulsifier acid formed of phosphated and fivefold oxyethylated isononylphenol, and 5 g of azo-bis-isobutyronitrile is prepared and is warmed to 80° C. with vigorous stirring. To this mixture an emulsion prepared from 1200 g of methylmethacrylate, 1 g of 2-ethylhexylthioglycolate, 3.5 g of the above emulsifier acid, 3.0 g of azo-bis-isobutyronitrile, and 1100 g of water is added dropwise with slow stirring over a period of 4 hours at 80° C.

After addition, the resulting mixture is kept at 80° C. for another 90 minutes. After cooling to room temperature, the mixture is filtered to yield a dispersion of low viscosity which is easy to handle with a solids content of 39 percent by weight. The dispersion is precipitated as described in Example 7 to yield a powder which dissolves in methylethyl ketone to give a clear solution.

What is claimed is:

1. A method for making a solid polymer product containing less than 0.01 percent of salt by weight of said polymer, which method comprises dispersing monomers in an aqueous phase with from 0.01 to 2 percent, by weight of the polymer solids produced, of an emulsifier consisting essentially of a free emulsifier acid which is a long chain activated carboxylic acid or an acidic phosphate ester, phosphite ester, or phosphonic acid having a long chain alkyl group in the molecule, said free emulsifier acid having a $pK_a$ between 1.0 and 4.5, whereby an emulsion of said monomers is formed, free radically polymerizing said monomers in the absence of strong acids with an initiator which is free of salt and which will not form a salt in the course of the claimed method, whereby a stable polymer emulsion is formed, and then precipitating the polymer from said stable polymer emulsion by the addition thereto of a sufficient amount of a strong acid.

2. A method as in claim 1 wherein said free acid emulsifier is a member selected from the group consisting of:

alkyl malonates and succinates of the formula

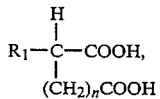

wherein $R_1$ is alkyl having from 8 to 22 carbon atoms and n is 0 or 1;

alkyltricarboxylates of the formula

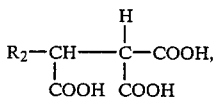

wherein $R_2$ is alkyl having from 6 to 22 carbon atoms;

fluorinated carboxylic acids of the formula

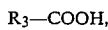

wherein $R_3$ is at least partially fluorinated alkyl having from 5 to 20 carbon atoms;

free acids of long chain substituted amino acids of the formula

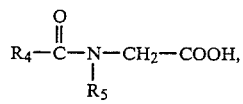

wherein $R_4$ is alkyl having from 1 to 20 carbon atoms and $R_5$ is hydrogen or alkyl having from 1 to 20 carbon atoms, providing that the sum of the carbon atoms of $R_4$ and $R_5$ is greater than 6 and less than 22;

free long chain oxocarboxylic acids of the formula

wherein $R_6$ is alkyl having from 1 to 20 carbon atoms and $R_7$ is hydrogen or alkyl having from 1 to 18 carbon atoms, providing that the sum of the carbon atoms of $R_6$ and $R_7$ is greater than 6 and less than 22;

phosphoric acid monoesters or phosphate diesters of the formula

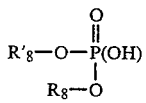

wherein $R_8$ is alkyl having from 6 to 20 carbon atoms, aryl substituted with $C_2$-$C_{22}$ alkyl, or is phenyl or oxyethylated alkylphenol having from 4 to 16 carbon atoms in the alkyl and formed by reaction with from 1 to 10 ethylene oxide units, and $R'_8$ is $R_8$, hydrogen, or alkyl having from 1 to 20 carbon atoms;

phosphoric acid esters of glycols and glycerides of the formula

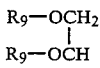

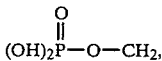

wherein $R_9$ is hydrogen or alkyl having from 1 to 20 carbon atoms, or is $R_{10}$—COO— wherein $R_{10}$ is alkyl having from 1 to 20 carbon atoms, providing that an alkyl group having 8 or more carbon atoms be present in the molecule;

or is a complex phosphonate of the formula

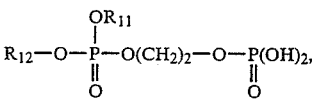

wherein $R_{11}$ is alkyl having from 8 to 20 carbon atoms and $R_{12}$ has from 1 to 20 carbon atoms.

3. A method as in claim 1 wherein said initiator is selected from the group consisting of per compounds, azo compounds, and redox systems.

4. A method as in claim 1 wherein said strong acid used for precipitation is an organic acid having a pKa between 0 and 2.5 or is a mineral acid having a pKa less than 2.5.

5. A method as in claim 1 wherein said monomers are predominantly difficultly soluble in water or are insoluble in water.

6. A method as in claim 1 wherein said monomers are selected from the group consisting of acrylic and methacrylic monomers.

7. A method as in claim 6 wherein said monomers are selected from the group consisting of acrylate esters and methacrylate esters.

* * * * *